United States Patent
Kral et al.

(10) Patent No.: US 11,560,032 B2
(45) Date of Patent: Jan. 24, 2023

(54) SYSTEM AND METHOD FOR DETERMINING WHETHER TO ADJUST THE RIDE HEIGHT OF A VEHICLE

(71) Applicant: JAGUAR LAND ROVER LIMITED, Coventry (GB)

(72) Inventors: Konrad Kral, Warwickshire (GB); William Burdock, Warwickshire (GB); Philip Guest, Warwickshire (GB)

(73) Assignee: Jaguar Land Rover Limited, Coventry (GB)

(*) Notice: Subject to any disclaimer, the term of this patent is extended or adjusted under 35 U.S.C. 154(b) by 553 days.

(21) Appl. No.: 16/322,164

(22) PCT Filed: Jul. 27, 2017

(86) PCT No.: PCT/EP2017/069082
§ 371 (c)(1),
(2) Date: Jan. 31, 2019

(87) PCT Pub. No.: WO2018/024612
PCT Pub. Date: Feb. 8, 2018

(65) Prior Publication Data
US 2019/0193507 A1    Jun. 27, 2019

(30) Foreign Application Priority Data
Aug. 4, 2016 (GB) ...................................... 1613478

(51) Int. Cl.
B60G 17/0165 (2006.01)
(52) U.S. Cl.
CPC .... B60G 17/0165 (2013.01); *B60G 2400/204* (2013.01); *B60G 2400/82* (2013.01);
(Continued)

(58) Field of Classification Search
None
See application file for complete search history.

(56) References Cited

U.S. PATENT DOCUMENTS

| 4,685,689 A | 8/1987 | Takizawa et al. |
| 4,744,589 A * | 5/1988 | Buma ................ B60G 17/0165 |
| | | 280/5.514 |

(Continued)

FOREIGN PATENT DOCUMENTS

| DE | 3519587 | 12/1985 |
| DE | 3826843 | 2/1990 |

(Continued)

OTHER PUBLICATIONS

Search and Examination Report, GB1613478.5, dated Feb. 3, 2017, 5 pp.

(Continued)

*Primary Examiner* — Navid Z. Mehdizadeh
(74) *Attorney, Agent, or Firm* — McCoy Russell LLP

(57) ABSTRACT

The present invention relates to a system for determining whether to inhibit lowering of the ride height of a vehicle when the vehicle speed exceeds a speed threshold value. The system includes a processor having an input configured to receive ride attribute data from at least one on-board vehicle ride attribute sensor, the ride attribute data being indicative of the roughness of the surface over which the vehicle is travelling, and a data memory configured to store at least one predetermined ride attribute threshold value for the or each ride attribute sensor. The processor is configured to calculate a ride attribute parameter in dependence on the received ride attribute data for the or each ride attribute sensor. The processor is also configured to compare the or each calculated ride attribute parameter with the corresponding at least one predetermined ride attribute threshold value to determine whether the vehicle is travelling on a smooth surface or a rough surface, and to inhibit lowering of the ride height when it is determined that the vehicle is travelling on a rough surface.

20 Claims, 8 Drawing Sheets

(52) U.S. Cl.
CPC ...... *B60G 2500/30* (2013.01); *B60G 2600/07* (2013.01); *B60G 2800/914* (2013.01)

(56) References Cited

U.S. PATENT DOCUMENTS

| | | | |
|---|---|---|---|
| 4,936,604 A | 6/1990 | Kawagoe | |
| 5,521,594 A | 5/1996 | Fukushima | |
| 6,412,788 B1 | 7/2002 | Ichimaru | |
| 7,168,709 B2 * | 1/2007 | Niwa | B60G 17/0165 280/5.518 |
| 8,755,970 B2 * | 6/2014 | Koumura | B60W 30/00 701/37 |
| 9,662,955 B2 * | 5/2017 | Popham | B60G 17/0165 |
| 9,952,049 B2 * | 4/2018 | Zhang | G01C 21/16 |
| 2005/0212225 A1 | 9/2005 | Suzuki | |
| 2014/0195112 A1 | 7/2014 | Lu | |
| 2016/0031287 A1 * | 2/2016 | Guest | B60G 17/0165 701/37 |
| 2017/0267045 A1 * | 9/2017 | Ikeda | B60R 16/0232 |

FOREIGN PATENT DOCUMENTS

| | | |
|---|---|---|
| DE | 102008054476 | 6/2010 |
| EP | 0412719 | 2/1991 |
| EP | 0428096 | 5/1991 |
| EP | 0465849 | 1/1992 |
| EP | 3047987 | 7/2016 |
| GB | 2230358 | 10/1990 |
| GB | 2511830 | 9/2014 |
| WO | 0220319 | 3/2002 |
| WO | 2005021297 | 3/2005 |

OTHER PUBLICATIONS

International Search Report and Written Opinion, dated Nov. 7, 2017, 10 pp.

* cited by examiner

SYSTEM AND METHOD FOR DETERMINING WHETHER TO ADJUST THE RIDE HEIGHT OF A VEHICLE

CROSS-REFERENCE TO RELATED APPLICATIONS

This application is a 371 of International Application No. PCT/EP2017/069082, filed Jul. 27, 2017, which claims priority to GB Patent Application 1613478.5, filed Aug. 4, 2016, the contents of both of which are incorporated by reference herein in their entirety.

TECHNICAL FIELD

The present disclosure relates to a system for use in a vehicle and particularly, but not exclusively, to a system for determining whether to adjust the ride height of a vehicle. Aspects of the invention relate to a system, to a vehicle and to a method.

BACKGROUND

There are many advantages to lowering the ride height or suspension of a vehicle. For instance, it is known that the aerodynamic performance of a vehicle can be improved if the vehicle body sits lower to the surface over which the vehicle is travelling. This is because the reduced air flow passing between the vehicle undercarriage and the surface results in reduced vehicle drag. In turn, this can improve the vehicle's fuel efficiency.

Lowering the ride height can also improve the traction and/or handling of the vehicle. The lowered centre of gravity may reduce longitudinal and lateral weight transfer in dynamic manoeuvres. This can lead to a reduced variation in tyre contact force, which in turn can improve grip between the tyres and the surface.

A further advantage of ride height lowering is increased driver comfort because of the reduced tendency of the vehicle to roll. The vehicle's stability in side winds or cross winds may also be improved, which is particularly desirable, for instance, when passing commercial vehicles on a motorway.

Some or all of the above advantages may be particularly felt when the vehicle is travelling at relatively high speed, for instance when travelling along a motorway. Current systems are designed to lower a vehicle's ride height automatically upon the vehicle speed rising above a predetermined value. However, it is not always desirable for the ride height to be lowered in such cases as this can be detrimental to ride quality, for instance by reducing passenger comfort.

It is an aim of the present invention to address one or more of the problems associated with the prior art.

SUMMARY OF THE INVENTION

According to an aspect of the present invention there is provided a system for determining whether to inhibit lowering of the ride height of a vehicle when the vehicle speed exceeds a speed threshold. The system includes a processor having an input configured to receive vehicle ride attribute data from at least one on-board vehicle ride attribute sensor, the vehicle ride attribute data being indicative of the roughness of the surface over which the vehicle is travelling, and a data memory configured to store at least one predetermined vehicle ride attribute threshold value for the or each ride attribute sensor. The processor is configured to calculate a ride attribute parameter in dependence on the received ride attribute data for the or each ride attribute sensor. The processor is also configured to compare the or each calculated vehicle ride attribute parameter with the corresponding at least one predetermined vehicle ride attribute parameter to determine whether the vehicle is travelling on a smooth surface or a rough surface, and to inhibit lowering of the ride height when it is determined that the vehicle is travelling on a rough surface.

The speed threshold may correspond to a speed at which a standard vehicle speed lowering system is typically operable, which may be a relatively high speed. For instance, the speed threshold may be approximately 50 mph (80.47 kph), or more particularly above approximately 65 mph (104.61 kph). The speed threshold may be any appropriate speed.

In a standard vehicle speed lowering system, the vehicle ride height will be lowered automatically when the vehicle speed increases above the threshold speed (i.e. increases to relatively high speed). However, lowering of the vehicle ride height can reduce vehicle comfort (or ride performance) and can increase the chance of causing damage to the vehicle's suspension. This is particularly the case when the vehicle is travelling over surfaces of relatively low quality, i.e. relatively rough surfaces. The present invention is advantageous in that the vehicle ride height is not lowered automatically when the vehicle speed is greater than the speed threshold, rather an additional determination as to the quality of the surface over which the vehicle is travelling is made before doing so. In particular, if it is determined that the quality of the surface is such that lowering the ride height would adversely affect vehicle performance (i.e. a 'rough' surface) then the system inhibits lowering of the ride height. This greatly reduces ride comfort degradation when travelling on such rough, metalled or non-metalled surfaces.

The present system may be operable when the vehicle is travelling at any speed. In this case, the system is configured to first determine whether the current vehicle speed is greater than a predetermined speed threshold. The system may be configured to compare the received and predetermined ride attribute data so as to determine an indication of the surface roughness only if the system determines that the vehicle is travelling above the speed threshold.

In embodiments, the processor comprises an electronic processor having an electrical input for receiving the ride attribute data and the data memory comprises an electronic memory device electrically coupled to the electronic processor and having instructions stored therein. In these embodiments, the processor is configured to access the memory device and execute the instructions stored therein such that it is operable to calculate the or each ride attribute parameter in dependence on the received ride attribute data. Also, the processor is configured to compare the or each calculated ride attribute parameter with the corresponding at least one predetermined ride attribute threshold value to determine whether the vehicle is travelling on a smooth surface or a rough surface, and to inhibit lowering of the ride height when it is determined that the vehicle is travelling on a rough surface.

The processor may have an output configured to send a control signal to one or more vehicle suspension components in dependence on the determination of whether to inhibit lowering of the vehicle ride height. The vehicle suspension components include one or more of suspension springs, shock absorbers, tyres and linkages.

In some embodiments, the input is configured to receive a current vehicle speed from a vehicle speed sensor and the processor is configured to determine whether the current vehicle speed is greater than the speed threshold value.

The processor may have at least one band pass filter configured to attenuate the received ride attribute data so as to calculate the or each ride attribute parameter. This allows signals that are of frequencies of interest to be retained and analysed while reducing outlying noise signals.

The processor may have at least one absolute value calculator configured to calculate the absolute value of the received ride attribute data so as to calculate the or each ride attribute parameter. This simplifies the process of then analysing the signal as, for example, the number of thresholds to consider may be reduced by half, i.e. only thresholds for positive values need be considered.

The processor may have at least one exponentially weighted moving average filter configured to calculate a moving average of the received ride attribute data at predetermined intervals and to apply exponential weights to the calculated moving averages so as to calculate the or each ride attribute parameter. The use of exponentially weighted moving averages means that the vehicle does not respond to every 'rough road' event, guarding against repeated adjustment of the ride height over a relatively short period of time.

The at least one predetermined ride attribute threshold value may include an ON/OFF threshold value for the or each sensor, wherein any value of the or each calculated ride attribute parameter above the corresponding ON/OFF threshold value is indicative of a rough surface and any value of the or each calculated ride attribute parameter below the corresponding ON/OFF threshold value is indicative of a smooth surface.

The processor may determine that vehicle ride height lowering should be inhibited when at least one of the calculated ride attribute parameters is above, or alternatively below, the corresponding ON/OFF threshold.

The at least one predetermined ride attribute threshold value may include an ON threshold value for the or each sensor, wherein a temporal increase in the calculated ride attribute parameter from below the corresponding ON threshold to above the corresponding ON threshold is indicative of a rough surface. The system may equally be calibrated such that a temporal decrease in the calculated ride attribute parameter from above the corresponding ON threshold to below the corresponding ON threshold is indicative of a rough surface.

The processor may determine that vehicle ride height lowering should be inhibited when at least one of the calculated ride attribute parameters increases, or alternatively decreases, temporally above the corresponding ON threshold.

The at least one predetermined ride attribute threshold value may include an OFF threshold value for the or each sensor, each OFF threshold value being less than the corresponding ON threshold value, and wherein a temporal decrease, or alternatively decrease, in the calculated ride attribute parameter from above, or alternatively below, the corresponding OFF threshold to below, or alternatively above, the corresponding OFF threshold is indicative of a smooth surface. The use of both ON and OFF thresholds guards against flickering between 'rough' and 'smooth' events, and thus guards against multiple adjustments of ride height over a relatively short period of time.

The processor may determine that vehicle ride height lowering should not be inhibited only if each of the calculated ride attribute parameters decreases, or alternatively increases, temporally below the corresponding OFF threshold.

The ride attribute data may include a measure of at least one of vehicle roll rate, vehicle pitch rate and vehicle heave acceleration. The ride attribute data may include a measure of at least one of vehicle wheel speed and vehicle body height relative to a wheel. The ride attribute data may include radar sensor output data from at least one on-board radar sensor. The ride attribute data may include acoustic sensor output data from at least one on-board acoustic sensor. A particular combination of ride attribute data from particular sensors may be used depending on the type of surface, i.e. type of 'roughness', which is of interest. A rough surface may include some or any of potholes, undulations, speed bumps, tree roots, trench patches, rover bumps, sunken manhole covers, corrugated roads, paving and ribs.

The ride attribute data may be received from at least one sensor in an inertial measurement unit.

The ride attribute data may be received from at least two on-board vehicle ride attribute sensors, and the processor is configured to compare the calculated ride attribute parameters with the corresponding predetermined ride attribute threshold values to determine whether to inhibit ride height lowering of the vehicle to at least one of at least two lowered vehicle ride height positions. The system may determine degrees of surface roughness to inhibit, for example, the lowest possible ride height but not inhibit lowering to other, less low, ride heights.

When the vehicle ride height has been lowered to a lowered position, the processor may be configured to send a control signal to raise the ride height to a raised position when it is determined that the vehicle is travelling on a rough surface. This ensures that if the vehicle transitions from travelling with a lowered ride height on a relatively smooth surface to a non-smooth surface, then the system acts to ensure that the ride height is adjusted appropriately, i.e. the system need not just be for inhibit lowering but can actively command ride height raising.

According to another aspect of the present invention there is provided a method for determining whether to inhibit lowering of the ride height of a vehicle when the vehicle speed exceeds a speed threshold value. The method comprises receiving ride attribute data from at least one on-board vehicle ride attribute sensor, the ride attribute data being indicative of the roughness of the surface over which the vehicle is travelling, and storing at least one predetermined ride attribute threshold value for the or each ride attribute sensor. The method also includes calculating a ride attribute parameter in dependence on the received ride attribute data for the or each ride attribute sensor, and comparing the or each calculated ride attribute parameter with the corresponding at least one predetermined vehicle ride attribute threshold value to determine whether the vehicle is travelling on a smooth surface or a rough surface. The method includes inhibiting lowering of the ride height when it is determined that the vehicle is travelling on a rough surface.

According to another aspect of the present invention there is provided a method for determining whether to inhibit lowering of the ride height of a vehicle, the method comprising receiving a current vehicle speed from a vehicle speed sensor and vehicle ride attribute data from at least one on-board vehicle ride attribute sensor, the vehicle ride attribute data being indicative of the roughness of the surface over which the vehicle is travelling, and determining whether the current vehicle speed is greater than a stored vehicle speed threshold value. If the current speed is greater than the speed threshold value, then the method further comprises calculating a ride attribute parameter in dependence on the received ride attribute data for the or each ride attribute sensor, and comparing the or each calculated vehicle ride attribute parameter with at least one stored corresponding predetermined vehicle ride attribute threshold value to determine an indication that the surface is either rough or smooth. If the surface is determined to be rough, then the method comprises sending a control signal to one or more vehicle suspension components to inhibit lowering of the vehicle ride height.

According to yet another aspect of the present invention there is provided a vehicle comprising a system as defined above.

According to yet another aspect of the present invention there is provided a non-transitory, computer-readable storage medium storing instructions thereon that when executed by one or more processors causes the one or more processors to carry out one or more of the methods defined above.

For the purposes of this disclosure, it is to be understood that the suspension system described herein can comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "vehicle suspension system" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 5a shows a measure of vehicle roll rate; FIG. 5b shows a measure of vehicle pitch rate; FIG. 5c shows a measure of vehicle heave acceleration; and FIG. 5d shows the determination of whether the surface is 'rough' or 'smooth' based on the data shown in FIGS. 5a, b, c;

DETAILED DESCRIPTION

In an embodiment of the present invention, a vehicle suspension system determines an indication of the roughness of the surface over which the vehicle is travelling when the vehicle is travelling above a threshold speed, and then uses this determination to determine whether to inhibit lowering of the vehicle ride height. Similarly, this determination may be used to determine whether to raise the vehicle ride height from a lowered position to a raised position.

Figure 1A:
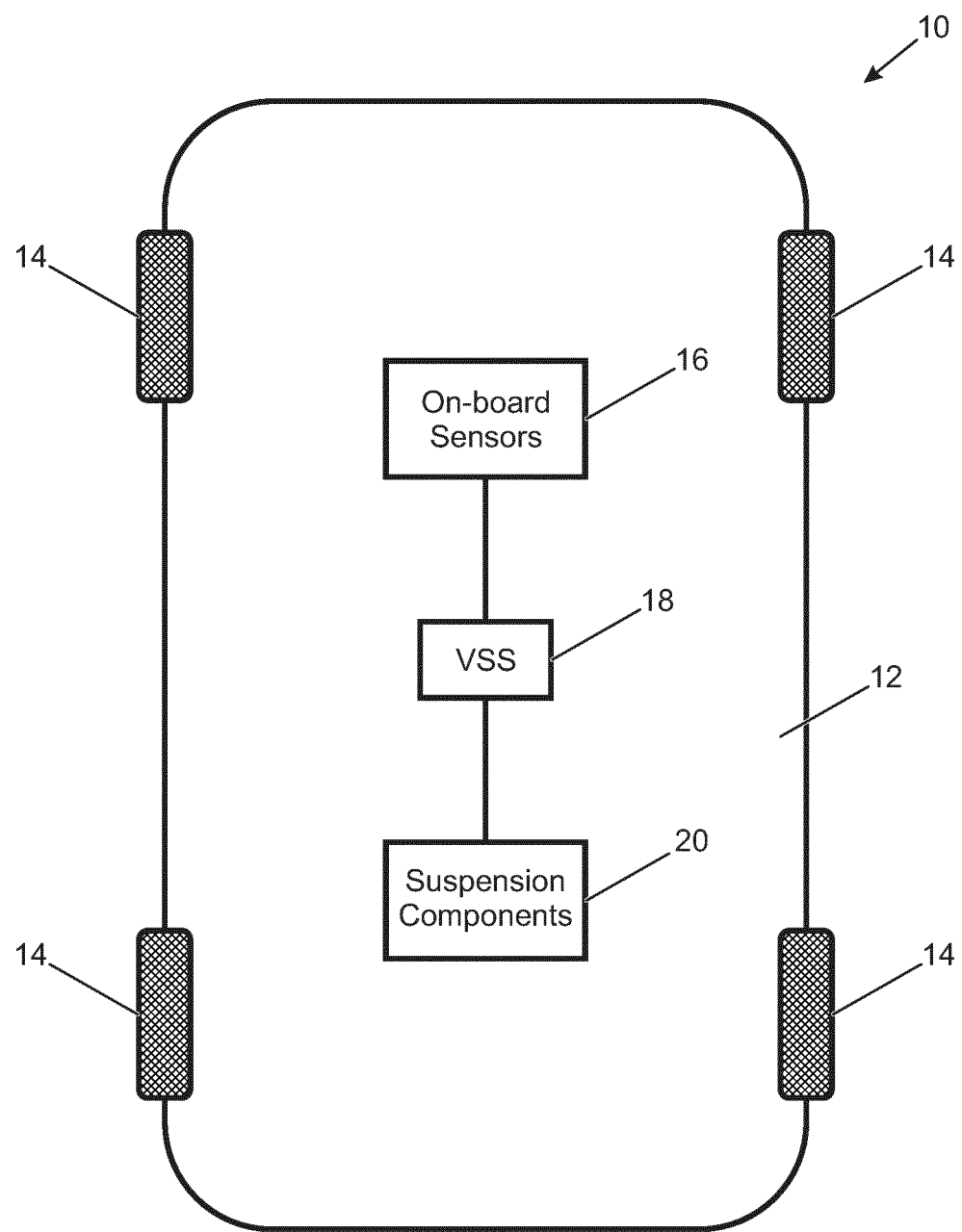
FIG. 1a shows a schematic overhead view of a vehicle including a vehicle suspension system (VSS) according to an embodiment of the present invention, the vehicle also including on-board sensors and suspension components.

FIG. 1a shows an overhead view of a vehicle 10 that includes a vehicle body 12 and four wheels 14. The vehicle 10 also includes one or more on-board vehicle sensors 16, a vehicle suspension system (VSS) 18 according to an embodiment of the present invention, and vehicle suspension components 20. The suspension components 20 includes one or more components that connect the wheels 14 to the rest of the vehicle 10 in order to cause the vehicle ride height to be raised or lowered. These components 20 may include suspension springs, shock absorbers and linkages. The suspension components 20 may also include the vehicle tyres.

Figure 1C:
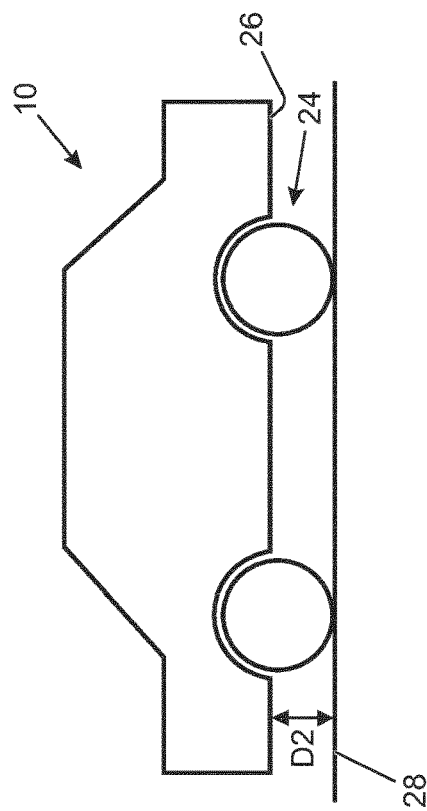
FIG. 1c shows a side view of the vehicle in a lowered position.
Figure 1B:
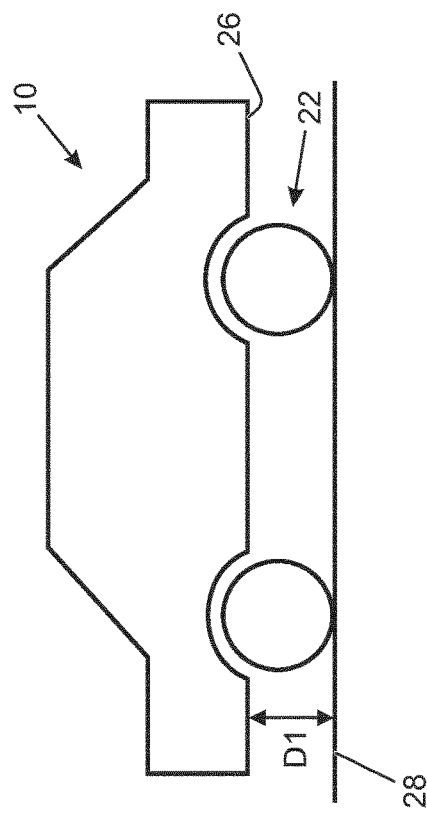
FIG. 1b shows a side view of the vehicle in a raised position.

FIGS. 1b and 1c show side views of the vehicle 10 in 'raised' and 'lowered' vehicle ride height positions 22, 24, respectively. The vehicle ride height, which may also be referred to as ground clearance, may be defined in any suitable way. In the presently described embodiment, the ride height is the shortest distance between the surface 28 and a particular part of the vehicle 10 not designed to contact the surface 28 continuously, i.e. not the tyres. This may be a defined part of the vehicle chassis or vehicle body, and is simply referred to as the undercarriage throughout. In the raised position 22, the undercarriage 26 of the vehicle body 12 is positioned a first distance D1 from the surface 28 over which the vehicle 10 is travelling. In the lowered position 24, the undercarriage 26 of the vehicle body 12 is positioned a second distance D2 from the surface 28, where D2 is less than D1. Typically, the difference between D1 and D2 may be between about 5 mm and 50 mm, and more specifically may be about 15 mm, although the difference may be any other appropriate value.

The VSS 18 can cause the vehicle body 12 to be raised or lowered between ride height positions 22, 24 by sending control signals to the suspension components 20. For instance, to adjust the ride height of the vehicle 10 between the raised and lowered positions 22, 24, the VSS 18 may cause a change in the volume of air in the springs using a compressor, e.g. an electric pump, or a stored air volume, e.g. an accumulator (for a vehicle that uses air suspension).

Figure 2:
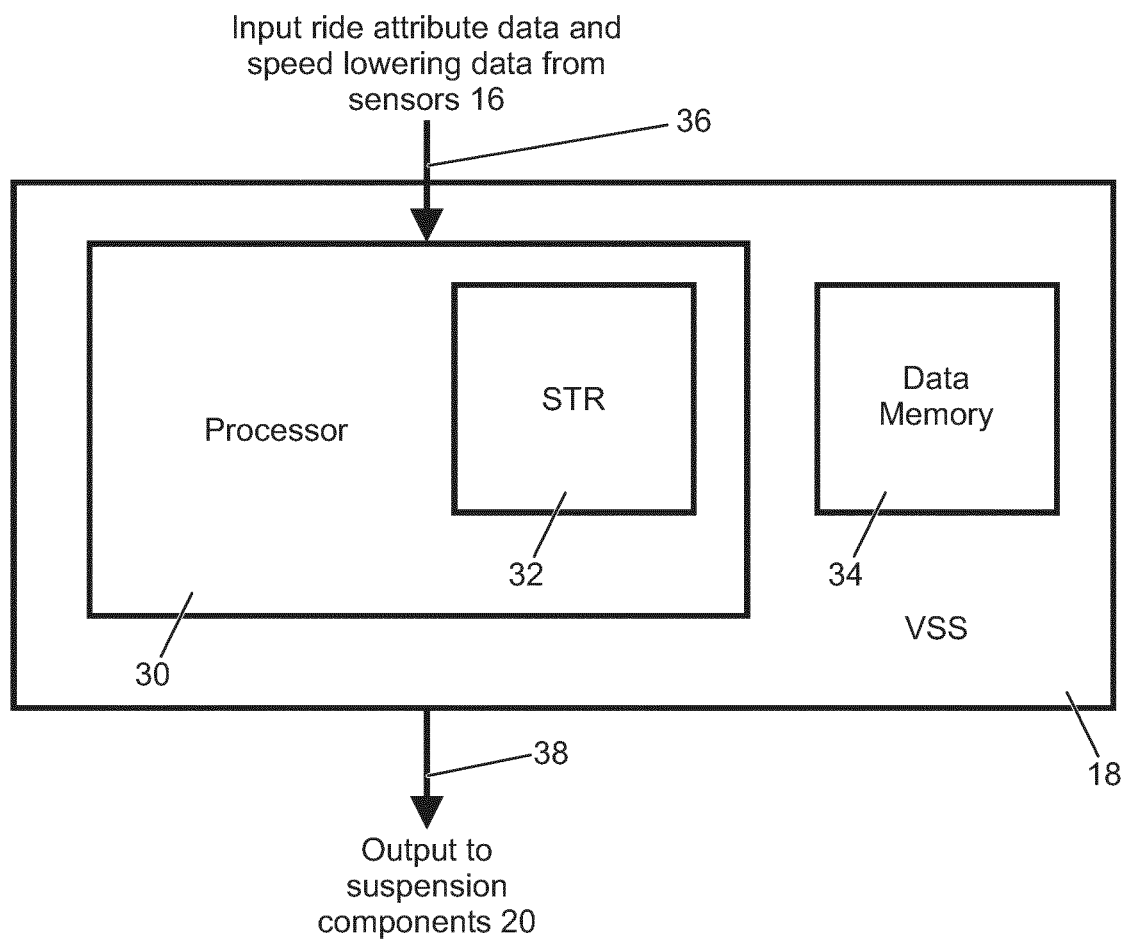
FIG. 2 shows the component parts of the VSS shown in FIG. 1, together with the inputs to, and outputs from, the VSS.

FIG. 2 shows the VSS 18 in greater detail. The VSS 18 includes a processor 30 for determining whether the ride height of the vehicle 10 should be adjusted between the raised and lowered positions 22, 24. The processor 30 includes a smooth terrain recognition (STR) module 32. The STR 32 is for determining whether the surface 28 over which the vehicle 10 is travelling is 'smooth' or 'rough'. The result of this determination is used by the processor 30 when determining whether ride height adjustment is needed.

The data processor 30 has an input 36 that is arranged to receive data from the on-board sensors 16. In particular, the processor 30 receives vehicle ride attribute data which is used by the STR 32 to determine whether the surface 28 is rough or smooth. In the presently described embodiment, the vehicle ride attribute data includes measures of the vehicle roll rate, vehicle pitch rate and vehicle heave acceleration (i.e. vertical acceleration). The on-board sensors 16 may include separate roll, pitch and heave sensors, or the roll, pitch and heave data may be received from a single inertia measurement unit (IMU) including a multi-dimensional accelerometer for measuring both linear and rotational accelerations in one or more directions. Such a multi-dimensional accelerometer may be taken to be three separate sensors for the present description, sending three different sets of ride attribute data. Typical intervals for the sensor data may be ±15 radians per second for vehicle roll, ±10 radians per second for vehicle pitch, and ±4 metres per second per second for vehicle heave.

The processor 30 also receives vehicle speed lowering data which is used to determine whether ride height adjustment is appropriate. Typically, this data includes vehicle speed data from a speed sensor of the vehicle 10. In short, ride height lowering is generally appropriate only when the vehicle speed is greater than a high-speed threshold value. This is discussed in greater detail below.

The VSS 18 includes a data memory or memory device 34 having instructions stored therein, the data processor 30 being arranged to execute said instructions in order to determine whether the surface is rough or smooth, and to determine whether the ride height should be adjusted. The data memory 34 may be an electronic, non-transitory, computer-readable storage medium. The data memory 34 also includes predetermined vehicle ride attribute data and predetermined vehicle speed lowering data that is used by the processor 30 in order that the above determinations may be made.

The processor 30 has an output 38 that is arranged to send a control signal to the suspension components 20. In particular, the control signal controls the suspension components 20 to switch the vehicle ride height from the raised position 22 to the lowered position 24 or from the lowered position 24 to the raised position 22, as is described below.

Figure 3:
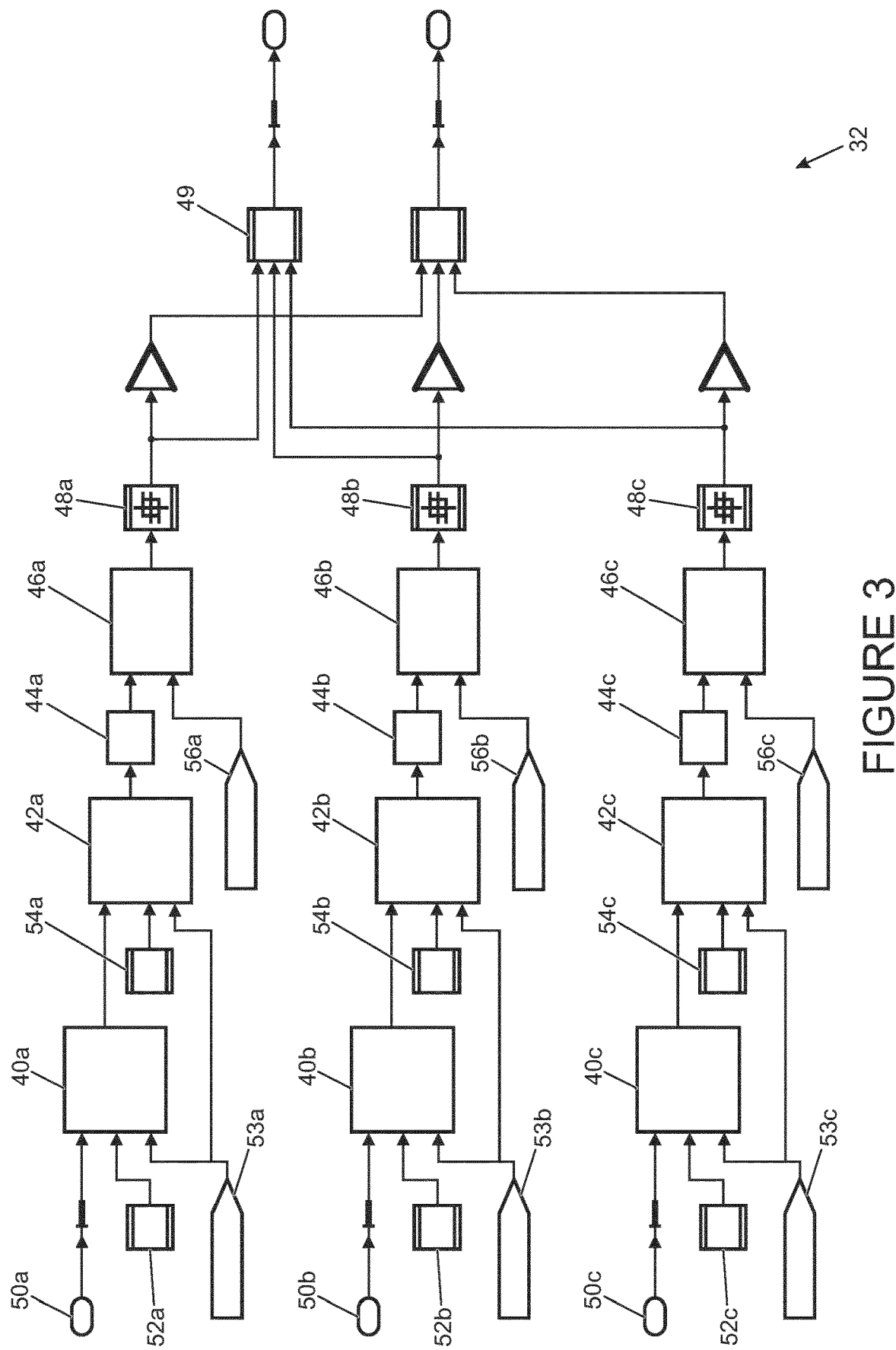
FIG. 3 shows a smooth terrain recognition (STR) component part of the VSS of FIG. 2 in greater detail.

FIG. 3 shows the structure of the STR 32 in greater detail. In particular, the STR 32 includes low pass filters 40a, 40b, 40c, high pass filters 42a, 42b, 42c, absolute value calculators 44a, 44b, 44c, exponentially weighted moving average filters 46a, 46b, 46c and relay blocks 48a, 48b, 48c for processing each of the respective received roll rate signals 50a, pitch rate signals 50b and heave acceleration signals 50c. The signals 50a, 50b, 50c are processed in parallel. The received ride attribute data 50a, 50b, 50c is processed by these filters to calculate so-called ride attribute parameters that may then be analysed.

Taking the roll rate signal 50a as an example, the low pass filter 40a receives inputs of the raw roll rate data from the sensors 16, a predetermined upper threshold roll rate value 52a from the data memory 34, and a filter sampling rate constant 53a, i.e. a calibration constant representing the execution rate of the system, also from the data memory 34. The low pass filter 40a acts to attenuate any part of the received roll rate signal 46a of a frequency above the upper threshold 52a and to pass any part of the signal 50a below the threshold 52a, and outputs the processed signal. In the presently-described embodiment, the upper threshold 52a is 20 Hz; however, any other suitable value may be used.

Similarly, the high pass filter 42a receives inputs of the processed roll rate data from the low pass filter 40a, a predetermined lower threshold roll rate value 54a from the data memory 34, and a filter sampling rate constant 55a. The high pass filter 42a acts to attenuate any part of the processed roll rate signal of a frequency below the lower threshold 54a and to pass any part of the signal above the threshold 54a, and outputs the processed signal. In the presently-described embodiment, the lower threshold 54a is 4 Hz; however, any other suitable value may be used.

The low and high pass filters 40a, 42a may be collectively referred to as band pass filters 40a, 42a, and this filter acts to smooth the received roll rate signal 50a before it is analysed such that short-term fluctuations are removed while still retaining the overall trend of the signal. Specifically, any frequencies that do not help to distinguish between 'rough' and 'smooth' surfaces are filtered out.

The roll rate signal 50a can include both positive and negative values, corresponding to roll acceleration of the vehicle 10 in both the left and right directions. For the purposes of analysing the signal, its absolute value is determined and output by the absolute value calculator 44a.

The exponentially weighted moving average filter 46a acts to ensure the roll rate signals 50a most recently received by the processor 30 have a higher weighting when analysing them for smooth or rough terrain recognition. This both helps the STR 32 to react more quickly to changes in surface roughness and to improve the consistency of surface roughness determination. In particular, the average of the most recent n processed signal values is calculated. Then, the a oldest values are discarded and replaced with a newly received values, where a<n, and the new average is calculated. This process repeats and the calculated averages are referred to as moving averages. Weights are applied to these calculated moving averages, where the weights decrease exponentially in the direction of averages relating to older received signals.

The exponentially weighted moving average filter 46a receives inputs of the processed roll rate data 50a from the absolute value calculator 44a and the moving average sample size 56a (i.e. the value of n) from the data memory 34. The sample size 56a is defined in terms of time, and for instance may include the signal values received in the previous 5 seconds. The moving average values are calculated at every time step, for instance if the sampling rate is 5 ms then the moving average value is calculated every 5 ms. every five seconds. The calculated average values are then output by the filter 46a.

The relay block 48a receives the moving average values and makes a determination of whether the measured roll rate signal 50a is indicative of a rough or a smooth surface. This process is described in greater detail below.

Figure 4:
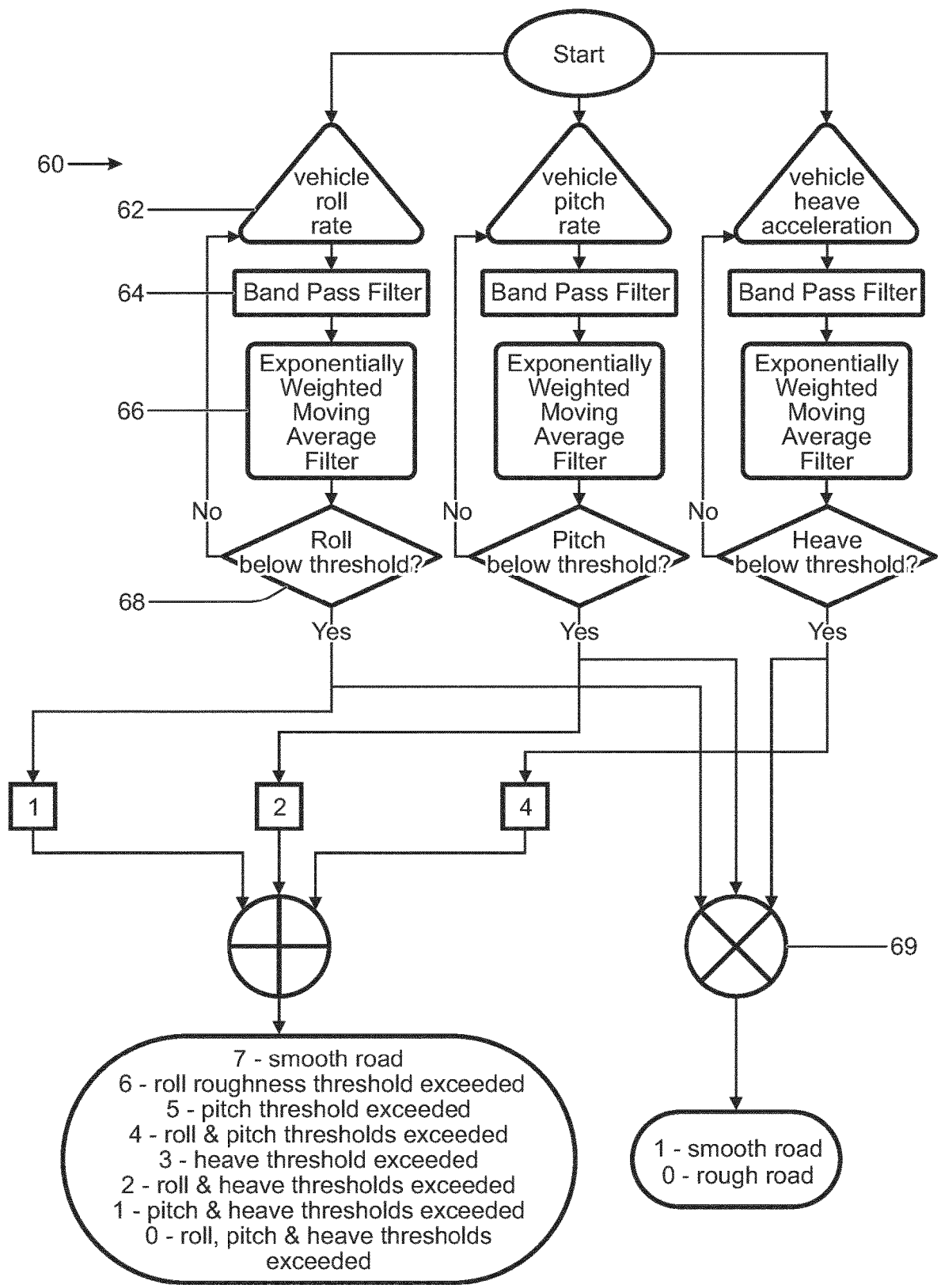
FIG. 4 shows a method undertaken by the STR of FIG. 3 for determining whether the surface over which the vehicle is travelling is 'rough' or 'smooth'.

FIG. 4 shows a method 60 undertaken by the STR 32 to determine whether the surface 28 over which the vehicle 10 is travelling is rough or smooth. At step 62, the STR 32 of the processor 30 receives the measured ride attribute data 50a, 50b, 50c from the sensors 16 in the form of roll rate signals 50a, pitch rate signals 50b and heave acceleration signals 50c. Typically, the sampling frequency of these signals may be 100 Hz, but any other suitable value may be used.

The received ride attribute data or signals 50a, 50b, 50c are passed through the band pass filters 40a, 40b, 40c, 42a, 42b, 42c at step 64 then the exponentially weighted moving average filters 46a, 46b, 46c at step 66, as described above. At step 68, the relay blocks 48a, 48b, 48c analyse each of the respective processed roll rate, pitch rate and heave acceleration signals to determine whether they are indicative of a smooth or a rough surface. This process is now described with reference to FIGS. 5 and 6.

Figure 5:
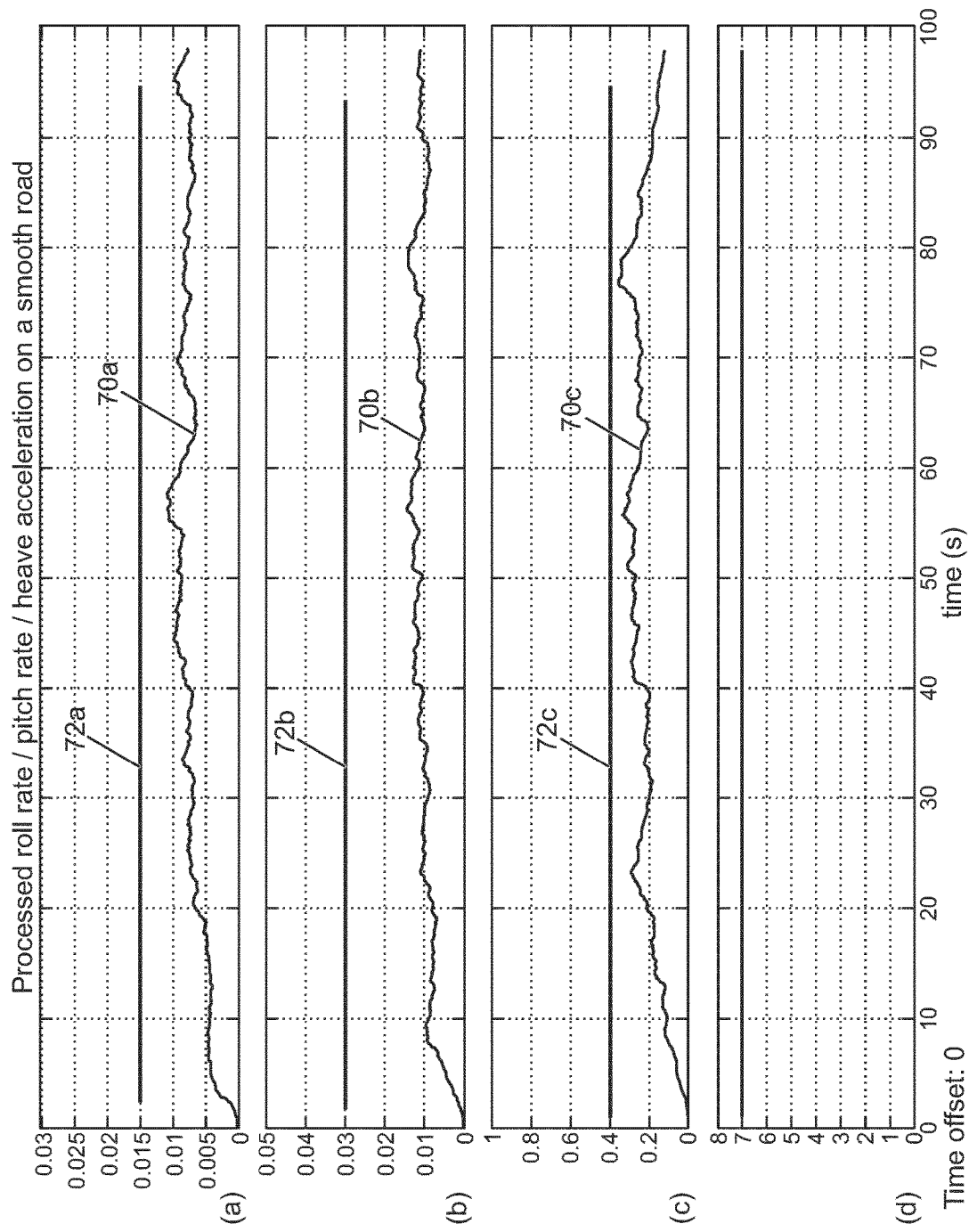
FIG. 5 shows plots of vehicle ride attribute data against time for a relatively 'smooth' surface, the vehicle ride attribute data being based on measurements by the on-board sensors of FIG. 1 and specifically.

FIG. 5 shows plots of the moving average values 70a, 70b, 70c of the signals 50a, 50b, 50c against time in the case of a relatively smooth surface. These moving average values will be used to determine whether the ride attribute data 50a, 50b, 50c is indicative of a smooth or a rough surface, and are also referred to ride attribute parameters 70a, 70b, 70c. In particular, FIGS. 5a, 5b, 5c show plots of the processed roll rate average 70a, pitch rate average 70b and heave acceleration 70c average, respectively. FIG. 5d shows how the type of surface as determined by the STR 32 varies over time.

Each of FIGS. 5a, 5b, 5c shows a so-called ON threshold value 72a, 72b, 72c. The ON threshold 72a, 72b, 72c is the value at which it is considered the particular moving average 70a, 70b, 70c increases from being indicative of a 'smooth' surface to being indicative of a 'rough' surface. The ON thresholds 72a, 72b, 72c for each of the processed signals of roll rate, pitch rate and heave acceleration are predetermined and stored in the data memory 34 for use by the relay blocks 48a, 48b, 48c. For instance, it is seen that in the present example the roll rate signal ON threshold 72a is equal to 0.015, while the pitch rate ON threshold 72b is 0.03 and the heave acceleration ON threshold 72c is 0.4. It is seen that in each of FIGS. 5a, 5b, 5c, the moving averages 70a, 70b, 70c remain below the respective ON thresholds 72a, 72b, 72c over the entire interval of around 100 seconds. This means that in this case, all three of the received signals 50a, 50b, 50c are indicative of a smooth surface over the entire interval shown.

Figure 6:
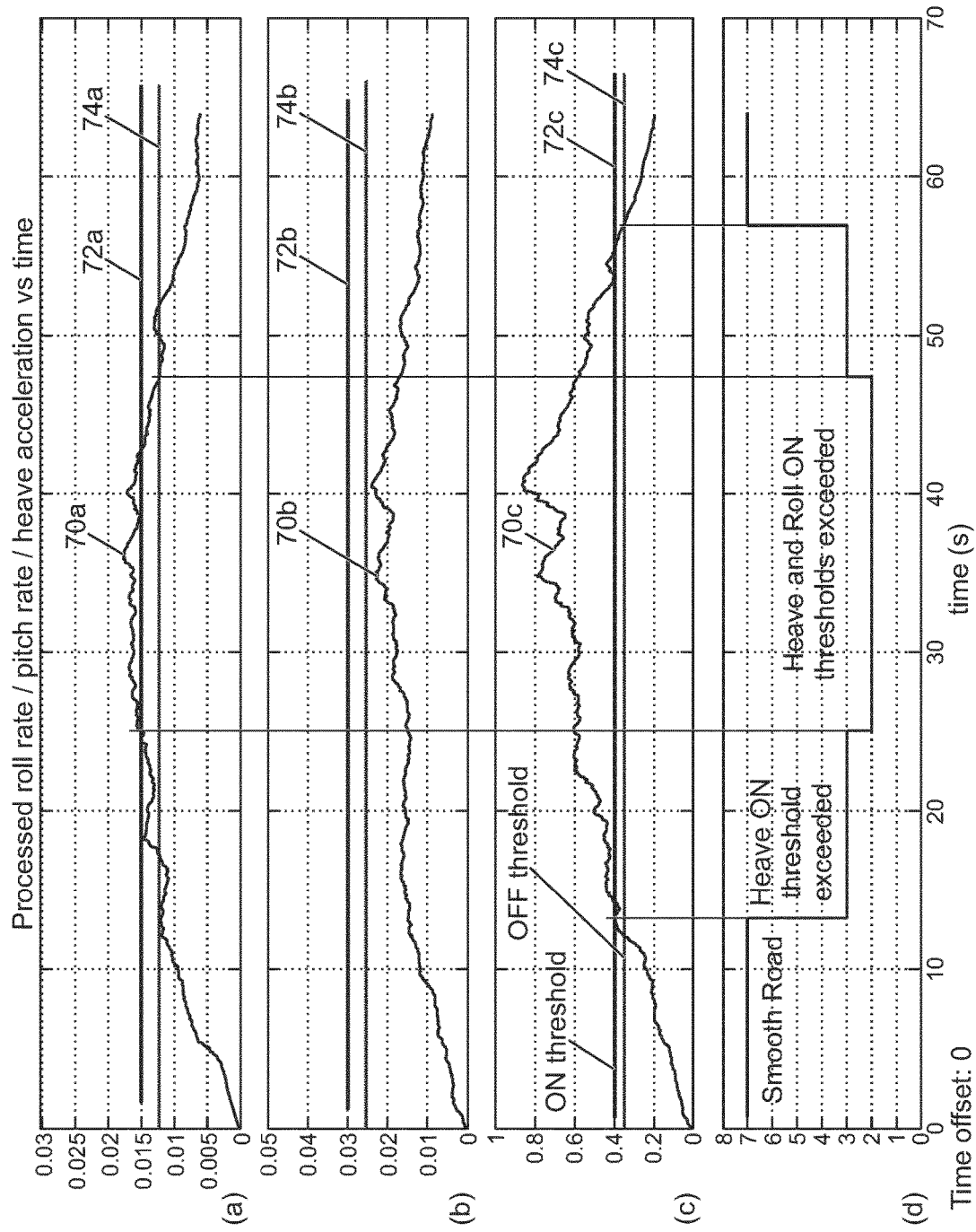
FIG. 6 shows the corresponding plots of FIG. 5 for a relatively 'rough' surface.

In contrast to the relatively smooth surface exhibited in the plots of FIG. 5, FIG. 6 shows the equivalent plots of the moving average values 70a, 70b, 70c of the signals 50a, 50b, 50c against time in the case of a relatively rough surface. The ON thresholds 72a, 72b, 72c are the same as in FIG. 5. Taking the roll rate moving average 70a in FIG. 6a as an example, it is seen that the moving average 70a is less than the ON threshold 72a in the interval from 0 seconds to around 25 seconds. Therefore, in the interval between 0 and around 25 seconds the roll rate signal 50a is indicative of a smooth surface. The moving average 70a increases above the ON threshold 72a at around 25 seconds, meaning that the roll rate signal 50a has become indicative of a rough surface at this point.

Each of FIGS. 6a, 6b, 6c also shows a so-called OFF threshold value 74a, 74b, 74c. The OFF threshold is the value at which it is considered the particular moving average decreases from being indicative of a rough surface to being indicative of a smooth surface. The OFF thresholds 74a, 74b, 74c are less than their respective ON thresholds 72a, 72b, 72c. In particular, the roll rate OFF threshold 74a is about 0.012, while the pitch rate OFF threshold 74b is about 0.025 and the heave acceleration OFF threshold 74c is about 0.35.

Again taking the roll rate moving average 70a as an example, FIG. 6a shows that the moving average 70a decreases below the OFF threshold 74a at around 47.5 seconds, meaning that the roll rate signal 50a has become indicative of a smooth surface at this point.

Each OFF threshold value 74a, 74b, 74c is not equal to its respective ON threshold value 70a, 70b, 70c in order to avoid any of the moving averages 70a, 70b, 70c flickering between being indicative of a smooth surface and of rough surface. This may be referred to as signal hysteresis, i.e. the earlier moving average value 70a, 70b, 70c determines whether the current moving average value 70a, 70b, 70c is indicative of a smooth or rough surface. Flickering could lead to the ride height of the vehicle 10 being raised and lowered several times over a short period of time, which is wholly undesirable. This also takes into account that there will be a slight delay when moving between the raised and lowered positions 22, 24, i.e. this is a reactive system to maintain driver comfort.

Returning to FIG. 4, at step 68 each of the relay blocks 48a, 48b, 48c outputs a determination of either 'smooth' or 'rough' as described above. At step 69, the gate 49 of the STR 32 makes an overall determination based on these outputs as to whether the surface 28 is determined to be smooth or rough. In the present embodiment, if any of the three relay blocks 48a, 48b, 48c output a determination of 'rough' then overall the surface 28 is determined overall to be rough, i.e. the gate 49 outputs the value 0. Only if all three of the outputs are 'smooth' is the overall determination of the surface 28 determined to be smooth, i.e. the gate 49 outputs the value 1.

Figure 7:
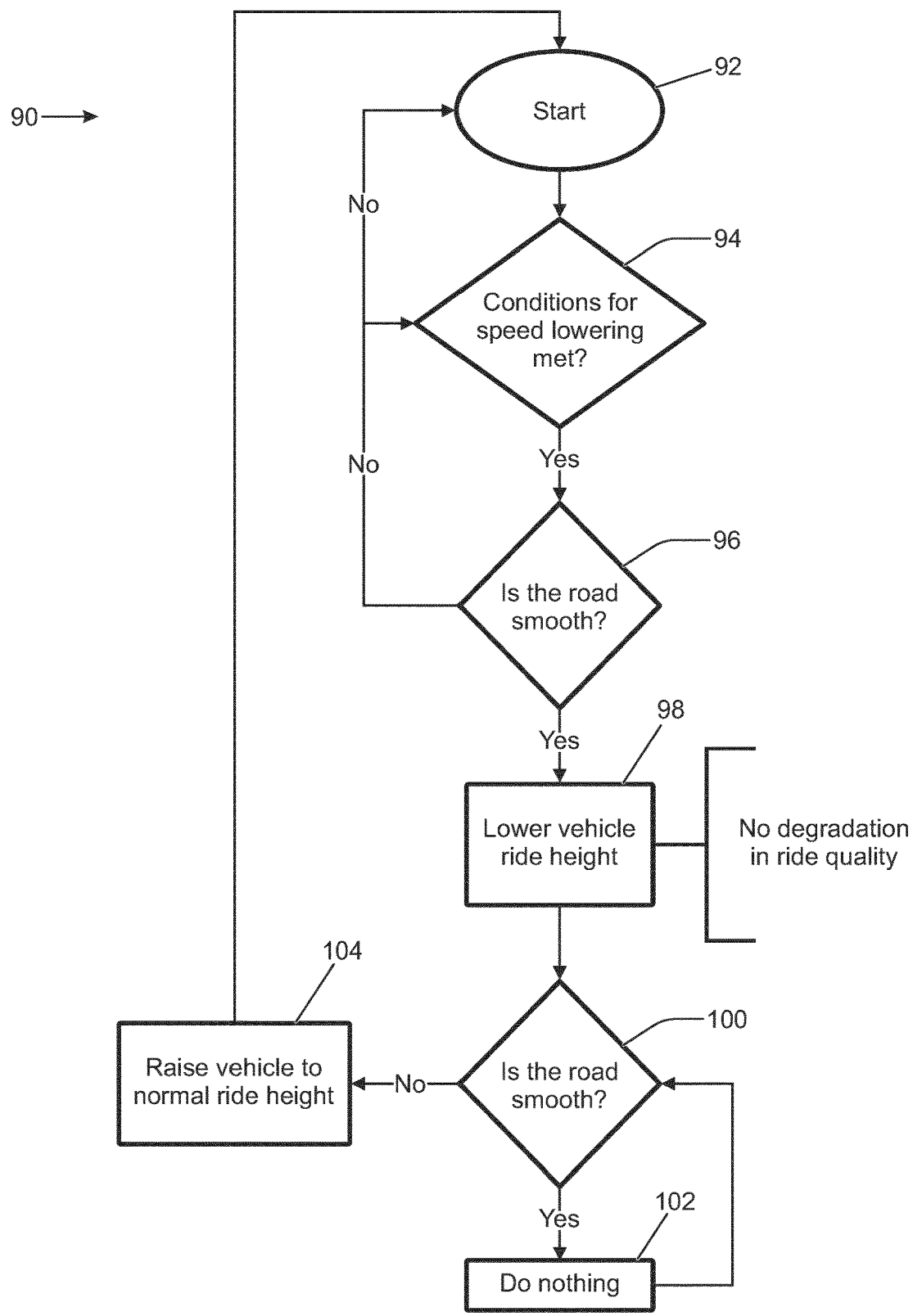
FIG. 7 shows a method undertaken by the VSS of FIG. 2 for determining whether the ride height of the vehicle of FIG. 1 should be adjusted.

The overall determination made by the STR 32 as to whether the surface 28 is smooth or rough is then used by the processor 30 to determine whether the vehicle ride height should be adjusted. FIG. 7 shows a method 90 undertaken by the processor 30 for determining whether the vehicle ride height should be adjusted. The method 90 starts at step 92 with the vehicle 10 in its raised position 22.

At step 94 the processor 30 determines whether the conditions for speed lowering are met. In particular, the processor 30 receives the speed lowering data from the sensors 16. In the present embodiment, the on-board sensors 16 include a vehicle speed sensor and the speed lowering data includes the current vehicle speed. The processor 30 also retrieves a predetermined threshold value of vehicle speed that is stored in the data memory 34. Specifically, at step 94 the processor 30 determines whether the current vehicle speed is greater than or less than the predetermined high-speed threshold value.

If the current speed is less than the predetermined threshold speed then the conditions for speed lowering are not met, meaning that the determination is that the vehicle ride height should not be adjusted, and the process returns to step 90. If the current speed is greater than the predetermined threshold speed then the conditions for speed lowering are met.

In this case, the method 90 moves on to step 96, at which the processor 30 determines whether the surface 28 is smooth or rough. In particular, the STR 32 of the processor 30 determines whether the surface 28 is smooth or rough according to the method 60 of FIG. 4 described above. Specifically, when any of the moving averages 70*a*, 70*b*, 70*c* increases with time from being below the ON threshold 72*a*, 72*b*, 72*c* to being above the ON threshold 72*a*, 72*b*, 72*c*, it is determined that the surface 28 is rough and so the ride height of the vehicle 10 should not be adjusted from its raised position 22 to its lowered position 24, i.e. an attempt at such an adjustment should be inhibited. In this case, the process returns to step 94.

When all of the moving averages 70*a*, 70*b*, 70*c* either decrease from above the ON threshold 72*a*, 72*b*, 72*c* to below the OFF threshold 74*a*, 74*b*, 74*c* or simply remain below the ON threshold 72*a*, 72*b*, 72*c*, then it is determined that the surface 28 is smooth. If the STR 32 determines that the surface 28 is smooth, then at step 98 the VSS 18 outputs a control signal 38 to the suspension components 20. The signal 38 commands the suspension components 20 to lower the ride height of the vehicle 10 from the raised position 22 to the lowered position 24 as described above. Expressed differently, any adjustment of the vehicle ride height should not be inhibited.

The vehicle 10 will then remain in the lowered position 24 until it is determined that the ride height should be raised to the raised position 22. In particular, at step 100 the processor 30 checks whether the surface 28 is determined to be smooth or rough in a similar way to above.

If the surface 28 is still determined to be smooth then the processor 30 does not send a control signal to adjust the ride height, and at step 102 loops back to step 100. If the surface 28 is determined to be rough then at step 104 the VSS 18 outputs a control signal 38 to the suspension components 20 to raise the vehicle ride height from the lowered position 24 to the raised position 22.

In the above-described embodiment, the surface is determined to be rough if any one of the ride attribute parameters are above the ON threshold; however, in other embodiments it may be required that a particular number, which may be less than or equal to the total number, of ride height parameters must be indicative of a rough surface before the overall determination is that the surface is rough.

In the above-described embodiment, the vehicle 10 has two ride height positions, i.e. raised and lowered positions 22, 24; however, in other embodiments the vehicle may have more than two ride height positions. In such embodiments, the system may determine the degree of roughness of the surface based on which of the sensors are providing data indicative of a rough surface. For instance, the system may control the suspension components 20 to adjust the ride height to a particular one of the three or more positions based on the determined degree of roughness. For instance, the degree of roughness may be determined to be between 0 and 6, as shown in FIG. 4. The particular value assigned to the surface roughness in FIG. 4 is dependent on which combination of the roll, pitch and heave thresholds have been exceeded by the received signals. For instance, it is seen that if the roll and heave thresholds are exceeded but the pitch threshold is not exceeded, then the processor outputs the value 2 (rather than simply a binary output corresponding to 'smooth' or 'rough'). This additional information may be useful in determining which particular ride heights should be inhibited. Also, in a system with more than two ride height positions, one or more of the ride height parameters may have more than one ON threshold and one or more particular ride heights could be inhibited depending on which of the at least two ON thresholds for a particular parameter has been exceeded.

The vehicle ride attribute data may be measured differently to how is described in the above-described embodiment. For instance, a single vertical accelerometer may be used to provide vehicle heave data, and two linear accelerometers may be used to provide each of the vehicle roll data and vehicle pitch data. It will be appreciated that the ride attribute data may be provided from various configurations of linear and/or rotational accelerometers.

In the described embodiment, the ride attribute data includes signals from three different sensors; however, signals from any number of sensors may be used. In different embodiments, the ride attribute data may include signals from sensors other than, or in addition to, a roll rate sensor, pitch rate sensor and heave acceleration sensor. For instance, the on-board sensors 16 could include sensors to provide measurements of any combination of engine speed, steering wheel angle, steering wheel rate, yaw rate, lateral acceleration, wheel speed, vehicle body height relative to a wheel, longitudinal acceleration, and throttle position. Also, any combination of acoustic, radar, optical and LIDAR sensors may be used to provide ride attribute data for determining the roughness or even the particular type of surface over which the vehicle is travelling or which is ahead of the vehicle. These sensors may be existing sensors on the vehicle, for example sensors used to input data to a parking assistance system of the vehicle. GPS or other navigational system data may be used to determine when the vehicle is approaching or travelling over a known 'rough' road and inhibit lowering of the ride height on this basis. When a rough road is detected, this information may be shared (via wireless signals or otherwise) with other vehicles.

The ON and OFF thresholds will be calibrated prior to the system being used. These will be based on what is accepted to be an 'acceptable' level of ride comfort for the driver and passengers by a subjective assessor.

Although the described embodiment includes both ON and OFF thresholds in order to guard against flickering as described above, different embodiments may include only a single ON/OFF threshold value wherein values of the moving average above the ON/OFF threshold are indicative of a rough surface and values of the moving average below the ON/OFF threshold are indicative of a smooth surface (i.e. there is no signal hysteresis).

Many modifications may be made to the above examples without departing from the scope of the present invention as defined in the accompanying claims.

The invention claimed is:

1. A system for determining whether to inhibit lowering of a ride height of a vehicle when the vehicle speed exceeds a speed threshold value, the system comprising:
   a processor having an input configured to receive ride attribute data from at least one on-board vehicle ride attribute sensor, the ride attribute data being indicative of a roughness of the surface over which the vehicle is travelling; and
   a data memory configured to store at least one predetermined ride attribute threshold value for each ride attribute sensor,
   wherein the processor is configured to calculate a ride attribute parameter based on the received ride attribute data for each ride attribute sensor; and wherein the processor is further configured to compare each calculated ride attribute parameter with the corresponding at least one predetermined ride attribute threshold value to determine whether the vehicle is travelling on a smooth surface or a rough surface, and to lower the ride height when the vehicle speed exceeds the speed threshold unless it is determined that the vehicle is travelling on a rough surface such that the ride height of the vehicle is not adjusted when the vehicle speed exceeds the speed threshold value while the vehicle is travelling on the rough surface.

2. The system according to claim 1, wherein:
the processor comprises an electronic processor having an electrical input for receiving the ride attribute data; and
the data memory comprises an electronic memory device electrically coupled to the electronic processor and having instructions stored therein,
the processor being configured to access the memory device and execute the instructions stored therein such that it is operable to calculate each ride attribute parameter based on the received ride attribute data and to compare each calculated ride attribute parameter with the corresponding at least one predetermined ride attribute threshold value to determine whether the vehicle is travelling on a smooth surface or a rough surface, and to inhibit lowering of the ride height when it is determined that the vehicle is travelling on a rough surface.

3. The system according to claim 1, the processor having an output configured to send a control signal to one or more vehicle suspension components based on the determination of whether to inhibit lowering of the vehicle ride height.

4. The system according to claim 3, wherein the vehicle suspension components include one or more of the following: suspension springs, shock absorbers, tires, and linkages.

5. The system according to claim 1, the input being configured to receive a current vehicle speed from a vehicle speed sensor, the data memory being configured to store the speed threshold value, and the processor being configured to retrieve the speed threshold value and to determine whether the current vehicle speed is greater than the speed threshold value.

6. The system according to claim 1, the processor having at least one band pass filter configured to attenuate the received ride attribute data so as to calculate each ride attribute parameter.

7. The system according to claim 1, the processor having at least one absolute value calculator configured to calculate the absolute value of the received ride attribute data so as to calculate each ride attribute parameter.

8. The system according to claim 1, the processor having at least one exponentially weighted moving average filter configured to calculate a moving average of the received ride attribute data at predetermined intervals and to apply exponential weights to the calculated moving averages so as to calculate each ride attribute parameter.

9. The system according to claim 1, the at least one predetermined ride attribute threshold value including an ON/OFF threshold value for each sensor, wherein any value of each calculated ride attribute parameter above the corresponding ON/OFF threshold value is indicative of a rough surface and any value of each calculated ride attribute parameter below the corresponding ON/OFF threshold value is indicative of a smooth surface.

10. The system according to claim 9, wherein the processor determines that vehicle ride height lowering should be inhibited when at least one of the calculated ride attribute parameters is above the corresponding ON/OFF threshold.

11. The system according to claim 1, the at least one predetermined ride attribute threshold value including an ON threshold value for each sensor, wherein a temporal increase in the calculated ride attribute parameter from below the corresponding ON threshold to above the corresponding ON threshold is indicative of a rough surface.

12. The system according to claim 11, wherein the processor determines that vehicle ride height lowering should be inhibited when at least one of the calculated ride attribute parameters increases temporally above the corresponding ON threshold.

13. The system according to claim 11, the at least one predetermined ride attribute threshold value including an OFF threshold value for each sensor, each OFF threshold value being less than the corresponding ON threshold value, and wherein a temporal decrease in the calculated ride attribute parameter from above the corresponding OFF threshold to below the corresponding OFF threshold is indicative of a smooth surface.

14. The system according to claim 13, wherein the processor determines that vehicle ride height lowering should not be inhibited only if each of the calculated ride attribute parameters decreases temporally below the corresponding OFF threshold.

15. The system according to claim 1, wherein the ride attribute data includes a measure of at least one of the following: vehicle roll rate, vehicle pitch rate, and vehicle heave acceleration.

16. The system according to claim 1, wherein the ride attribute data includes a measure of at least one of the following: vehicle wheel speed and vehicle body height relative to a wheel.

17. The vehicle comprising a system according to claim 1.

18. A method for determining whether to inhibit lowering of a ride height of a vehicle when the vehicle speed exceeds a speed threshold value, the method comprising:
receiving ride attribute data from at least one on-board vehicle ride attribute sensor, the ride attribute data being indicative of a roughness of the surface over which the vehicle is travelling;
storing at least one predetermined ride attribute threshold value for each ride attribute sensor;
calculating a ride attribute parameter based on the received ride attribute data for each ride attribute sensor; and
comparing each calculated ride attribute parameter with the corresponding at least one predetermined vehicle ride attribute threshold value to determine whether the vehicle is travelling on a smooth surface or a rough surface, and to lower the ride height when the vehicle speed exceeds the speed threshold unless it is determined that the vehicle is travelling on a rough surface such that the ride height of the vehicle is not adjusted when the vehicle speed exceeds the speed threshold value while the vehicle is travelling on the rough surface.

19. A non-transitory, computer-readable storage medium storing instructions thereon that when executed by one or more processors causes the one or more processors to carry out the method of claim 18.

20. A method for determining whether to inhibit lowering of a ride height of a vehicle, the method comprising:
receiving a current vehicle speed from a vehicle speed sensor and vehicle ride attribute data from at least one on-board vehicle ride attribute sensor, the vehicle ride attribute data being indicative of a roughness of the surface over which the vehicle is travelling; and determining whether the current vehicle speed is greater than a stored vehicle speed threshold value, wherein, if the current speed is greater than the speed threshold value, the method further comprising:

calculating a ride attribute parameter based on the received ride attribute data for each ride attribute sensor; and comparing each calculated vehicle ride attribute parameter with at least one stored corresponding predetermined vehicle ride attribute threshold value to determine an indication that the surface is either rough or smooth, and wherein, if the surface is determined to be rough, the method further comprising sending a control signal to one or more vehicle suspension components to inhibit lowering of the vehicle ride height such that the ride height of the vehicle is not adjusted when the vehicle speed exceeds the speed threshold value while the vehicle is travelling on the rough surface.

* * * * *